(12) United States Patent
Giraud et al.

(10) Patent No.: US 11,845,459 B2
(45) Date of Patent: Dec. 19, 2023

(54) DEVICE FOR REMOTE WARNING ABOUT THE STATE OF WEAR OF AT LEAST ONE WIPER BLADE OF A WINDSCREEN-WIPING SYSTEM

(71) Applicant: Valeo Systemes d'Essuyage, La Verriere (FR)

(72) Inventors: Frederic Giraud, La Verriere (FR); Laure Imbert, La Verriere (FR); Damien Coquet, La Verriere (FR); Eric Poton, La Verriere (FR)

(73) Assignee: Valeo Systemes d'Essuyage

( * ) Notice: Subject to any disclaimer, the term of this patent is extended or adjusted under 35 U.S.C. 154(b) by 624 days.

(21) Appl. No.: 17/053,243

(22) PCT Filed: Apr. 9, 2019

(86) PCT No.: PCT/EP2019/058875
§ 371 (c)(1),
(2) Date: Nov. 5, 2020

(87) PCT Pub. No.: WO2019/214886
PCT Pub. Date: Nov. 14, 2019

(65) Prior Publication Data
US 2021/0284189 A1    Sep. 16, 2021

(30) Foreign Application Priority Data
May 7, 2018   (FR) ...................................... 1853910

(51) Int. Cl.
*B60W 50/14*   (2020.01)
*B60S 1/38*    (2006.01)
(Continued)

(52) U.S. Cl.
CPC ............... *B60W 50/14* (2013.01); *B60S 1/38* (2013.01); *G07C 5/006* (2013.01); *G07C 5/008* (2013.01);
(Continued)

(58) Field of Classification Search
CPC ... B60W 50/14; B60W 2050/143; B60S 1/38; B60S 2001/3844; B60S 1/08; G07C 5/006; G07C 5/008; G07C 5/0808; G07C 5/0825
See application file for complete search history.

(56) References Cited

U.S. PATENT DOCUMENTS 9,403,509 B2   8/2016  Dias
9,520,006 B1  12/2016  Sankovsky et al.
(Continued)

FOREIGN PATENT DOCUMENTS

DE   102012011538 A1    1/2013
DE   202017106704 U1   12/2017
(Continued)

OTHER PUBLICATIONS

European Patent Office, International Search Report for corresponding International Application No. PCT/EP2019/058875, dated Jun. 27, 2019 (including English Translation).

(Continued)

*Primary Examiner* — Behrang Badii
(74) *Attorney, Agent, or Firm* — Valeo Systemes d'Essuyage

(57) ABSTRACT

The invention relates to a device for remotely giving warning as to the state of wear of at least one blade of a windshield-wiper system of a vehicle comprising means for determining the wear of said blade and means for flagging said wear; said device is noteworthy in that it comprises at least one unit comprising a module called the removable
(Continued)

diagnostic connector able to interact with a diagnostic service connector forming an on-board diagnostic input of the vehicle in order to establish a link with said diagnostic connector via the OBD protocol and means for communicating electronically that are coupled to the diagnostic connector and that are able to transmit, to a portable electronic apparatus, via a wireless link, a message indicating the wear of said blade when the means for determining the wear of the blade generate a signal referred to as a wear signal.

10 Claims, 2 Drawing Sheets

(51) Int. Cl.
    *G07C 5/00*     (2006.01)
    *G07C 5/08*     (2006.01)
(52) U.S. Cl.
    CPC ..... *G07C 5/0808* (2013.01); *B60S 2001/3844* (2013.01); *B60W 2050/143* (2013.01)

(56) References Cited

U.S. PATENT DOCUMENTS

| | | | | |
|---|---|---|---|---|
| 2007/0022558 | A1* | 2/2007 | Petkov | B60S 1/0477 15/250.361 |
| 2010/0132148 | A1* | 6/2010 | Carangelo | B60S 1/3801 15/250.361 |
| 2010/0320797 | A1* | 12/2010 | Schlater | B60J 10/70 296/93 |
| 2014/0088886 | A1* | 3/2014 | Dias | G01M 5/0033 702/34 |
| 2014/0305556 | A1* | 10/2014 | Moore | B60S 1/0491 150/154 |
| 2018/0130266 | A1 | 5/2018 | Santana Sanchez et al. | |
| 2018/0141519 | A1* | 5/2018 | Bennett | B60S 1/0405 |

FOREIGN PATENT DOCUMENTS

| | | |
|---|---|---|
| EP | 2393014 A1 | 12/2011 |
| FR | 3056785 A1 | 3/2018 |
| JP | 2003212099 A | 7/2003 |
| JP | 2013006505 A | 1/2013 |
| JP | 2014515330 A | 6/2014 |
| JP | 2016203933 A | 12/2016 |
| JP | 201772493 A | 4/2017 |
| WO | 2012159943 A1 | 11/2012 |

OTHER PUBLICATIONS

Japanese Patent Office, First Office Action (including English translation) of corresponding Japanese Patent Application No. 2020-562612, dated Jan. 31, 2023.

Chinese Patent Office, Office Action of corresponding Chinese Patent Application No. 201980027390.2, dated Feb. 21, 2023.

* cited by examiner

DEVICE FOR REMOTE WARNING ABOUT THE STATE OF WEAR OF AT LEAST ONE WIPER BLADE OF A WINDSCREEN-WIPING SYSTEM

CROSS-REFERENCE TO RELATED APPLICATIONS

This application is filed under 35 U.S.C. § 371 U.S. National Phase of International Application No. PCT/EP2019/058875 filed Apr. 9, 2019, (published as WO2019214886), which claims foreign priority benefit to French Application No. FR1853910 filed May 7, 2018, the disclosures of which are hereby incorporated by reference in their entirety.

TECHNICAL FIELD

The present invention relates to a device for remotely giving warning as to the state of wear of at least one wiper of a windshield-wiper system of a vehicle.

BACKGROUND

The replacement of the windshield-wiper blades of a vehicle is based on a balance between the visual comfort of the driver under rainy conditions and the cost of replacement of the blades. Keeping the blades, in so far as visibility is greatly impacted, could lead to the vision of the driver being degraded in case of rain and to the risk of an accident increasing because of this loss of visibility.

A number of solutions allowing the state of wear of the windshield-wiper blades of a vehicle to be detected are known.

A first solution consists in counting the number of wiping cycles of the windshield-wiper blades and of informing the user when a preset lifetime limit representative of an unacceptable state of wear is reached, the lifetime limit corresponding to a preset threshold number of wiping cycles of the windshield-wiper blades. However, this method does not take into account environmental factors such as exposure to ultraviolet light, temperature and meteorological conditions.

Another known solution is to monitor the wear of the windshield wiper by means of an optical sensor with which the windshield is scanned before and after the wiping operation. However, the optical sensor can monitor only one portion of the windshield and hence, since data can be gathered only for a small portion of the windshield wiper, the evaluation of the state of wear is not very reliable.

Another known solution is to fasten a wear element manufactured from the same material as the windshield-wiper blade to the structure holding the windshield-wiper blade. The wear element is subjected to the same operating and environmental conditions as the windshield wiper and, when the preset duration of effectiveness of the windshield wiper has passed, a segment of the wear element breaks off to reveal indicating means that inform the driver that he must change the windshield-wiper blade. However, this method requires the manufacture of specific windshield-wiper blades, which is usually complex.

In order to mitigate these drawbacks, a method and device for estimating the wear of windshield-wiper blades taking into account the state of wear of the entirety of the windshield-wiper blade and not requiring the addition of complex consumables have already been imagined. This is especially the case of international patent application WO2012/159943.

The document WO2012/159943 describes a method for estimating the state of wear of windshield-wiper blades of a vehicle windshield-wiper unit, in which said windshield-wiper unit comprises at least one windshield-wiper blade configured to wipe a windshield surface when it is activated, at least one motor configured to activate said windshield-wiper blade at a set wiping speed, and a controller configured to control said motor. The method consists in deducing or estimating a coefficient of friction between the windshield-wiper blade and the surface of the windshield and in comparing the deduced or estimated coefficient of friction with a preset first threshold value, in order to determine the wetness of the surface of the windshield, and, if the surface of the windshield is dry, to compare the deduced or estimated coefficient of friction to a second preset threshold value in order to estimate the state of wear of said windshield-wiper blade. The method comprises a step consisting in generating a warning signal on the vehicle dashboard when the at least one windshield-wiper blade is deemed worn.

This type of method, although effective, has the drawback of not being suitable for all motor vehicles, particularly in the "aftermarket" in so far as the vehicle must include the controller configured to deduce or estimate the coefficient of friction between said wiper blade and the surface of the windshield and to compare the deduced or estimated coefficient of friction with a first preset threshold value and/or a second preset threshold value, and wear-flagging means connected to said controller.

The invention therefore aims to provide a simple, effective and economical solution to this need, which is applicable to any motor vehicle, in particular in the "aftermarket".

SUMMARY To this end, and according to the invention, a device for remotely giving warning as to the state of wear of at least one blade of a windshield-wiper system of a vehicle comprising means for determining the wear of said blade and means for flagging said wear is provided; said device is noteworthy in that it comprises at least one unit comprising a module called the removable diagnostic connector able to interact with a diagnostic service connector forming an on-board diagnostic input of the vehicle in order to establish a link with said diagnostic connector via the OBD protocol and means for communicating electronically that are coupled to the diagnostic connector and that are able to transmit, to a portable electronic apparatus, via a wireless link, a message indicating the wear of said blade when the means for determining the wear of the blade generate a signal referred to as a wear signal.

Said message may then be displayed on said electronic apparatus.

It will be understood that the device according to the invention has the advantage of being stand-alone and of being connected to the OBD (in particular OBD II or EOBD) system that is present in all vehicles, and hence it may be employed as an "aftermarket" device in all vehicles.

Said means for determining the wear of said blade for example consist in a controller of the vehicle connected to the on-board diagnostic input of the vehicle.

According to one variant of execution, said means for determining the wear of said blade are integrated into said unit and are connected to the means for communicating electronically.

These means for determining the wear of the one or more blades for example comprise means for generating the wear signal depending on the number of wiping cycles of the one or more windshield-wiper blades.

Alternatively, the means for determining the wear of the blade comprise means for deducing or estimating a coefficient of friction between the one or more windshield-wiper blades and the surface of the windshield and means for generating a wear signal depending on said coefficient of friction and on the number of wiping cycles of the one or more windshield-wiper blades.

Moreover, the means for communicating electronically for example consist in a Bluetooth® transmitter that generates a communication according to the Bluetooth® protocol with the electronic apparatus and/or in a transmitter that generates a communication according to the IEEE 802.11p protocol with the electronic apparatus and/or in a GSM and/or GPRS transmitter that generates a telephonic communication with a remote server.

In addition, the portable electronic apparatus for example consists in a smartphone or in a tablet computer or the like.

Incidentally, the message transmitted to said electronic apparatus contains a hyperlink.

BRIEF DESCRIPTION OF THE DRAWINGS

Other advantages and features will become more clearly apparent from the following description of the device for remotely giving warning as to the state of wear of at least one blade of a windshield-wiper system according to the invention, which description is given, by way of non-limiting example, with reference to the appended drawings, in which.

DETAILED DESCRIPTION

In the rest of the description, elements having an identical structure or similar functions will be denoted by the same references.

Figure 1:
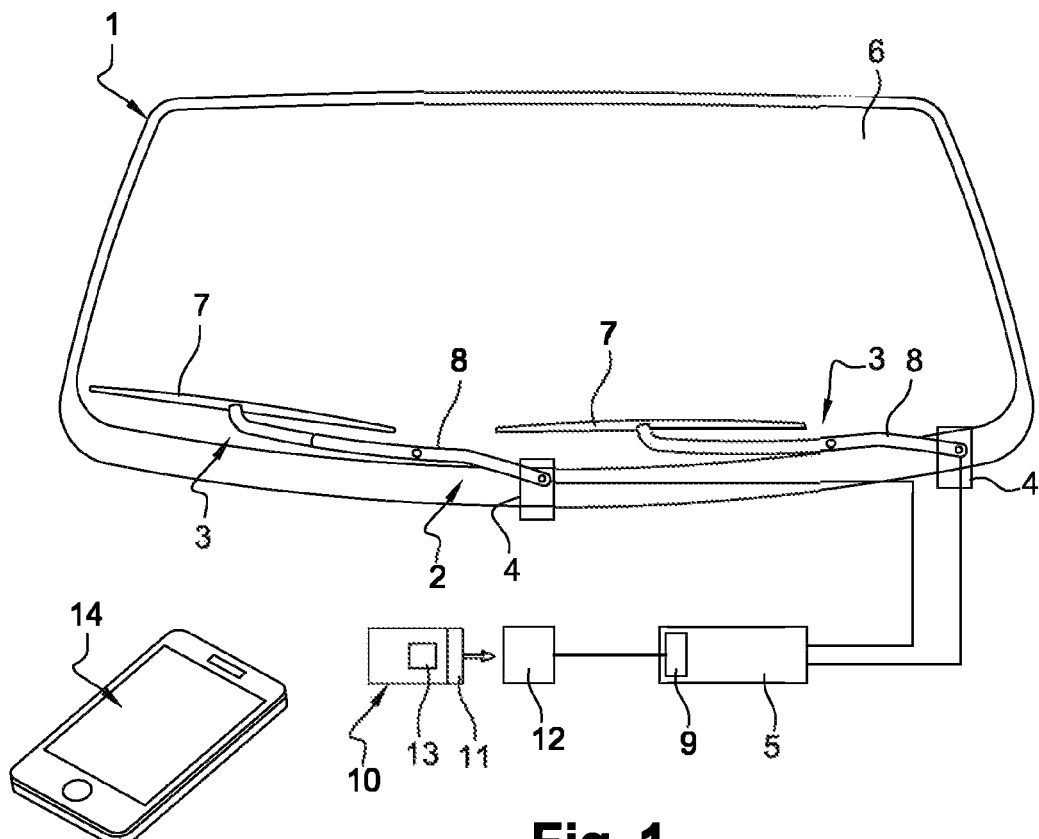
FIG. 1 is a schematic representation of the device for remotely giving warning as to the state of wear of at least one blade of a windshield-wiper system according to the invention.

With respect to the exemplary embodiment of the invention illustrated in FIG. 1, the latter schematically shows a windshield 1 and an associated windshield-wiper system 2 that for example comprises a set of blades 3, at least one motor 4 and a controller 5.

The windshield 1 comprises an external windshield surface 6 that receives rain or dirt, such as insect impacts for example, when the vehicle is in motion. On said windshield surface 6 is placed at least one set of windshield-wiper blades 3. Usually, the set of blades 3 comprises two windshield-wiper blades 7, a driver-side blade and a passenger-side blade, mounted at the end of windshield-wiper arms 8 that are driven to rotate by respective motors 4. In this particular exemplary embodiment, only the windshield-wiper blades 7 make contact with the windshield surface 6.

It will be observed that, in this particular exemplary embodiment, the windshield-wiper system 2 comprises two windshield-wiper blades 3, a driver-side blade and a passenger-side blade; however, obviously said windshield-wiper system 2 could comprise only a single windshield-wiper blade and/or incorporate the windshield-wiper blade of the rear window, without however departing from the scope of the invention.

The windshield-wiper system 2 is usually controlled by a user via a control (not shown in FIG. 1) or any other form of equivalent actuator well known to those skilled in the art, such an actuator possibly being in the passenger compartment of the vehicle and usually near the steering wheel or dashboard.

The windshield-wiper system 2 may also be controlled automatically via a rain sensor. Said rain sensor (not shown in FIG. 1) generally consists in an optical sensor placed on the surface of the windshield 6, said sensor using the infrared dispersion and the reflection of infrared rays inside the windshield 3 to determine the presence or absence of rain on the windshield surface 6.

Usually, a number of wiping speeds or preset programs are provided, namely off, single wipe, intermittent INT, low speed LS and high speed HS. To power the motors 4 that drive the set of blades 3, the controller 5 pulse-width modulates the current delivered to said motors 4.

Said motors 4 are able to set the set of blades 3 in motion by applying a torque to the base of the set of blades 3. Said motors 4 are supplied with electrical power via the controller 5, which is configured to apply specific wiping programs and thereby to control the wiping speed of the set of blades 3. Said electrical power is delivered by the battery of the vehicle or by an alternator of the vehicle.

Alternatively, provision could be made to provide a controller 5 for each motor 4.

Figure 2:
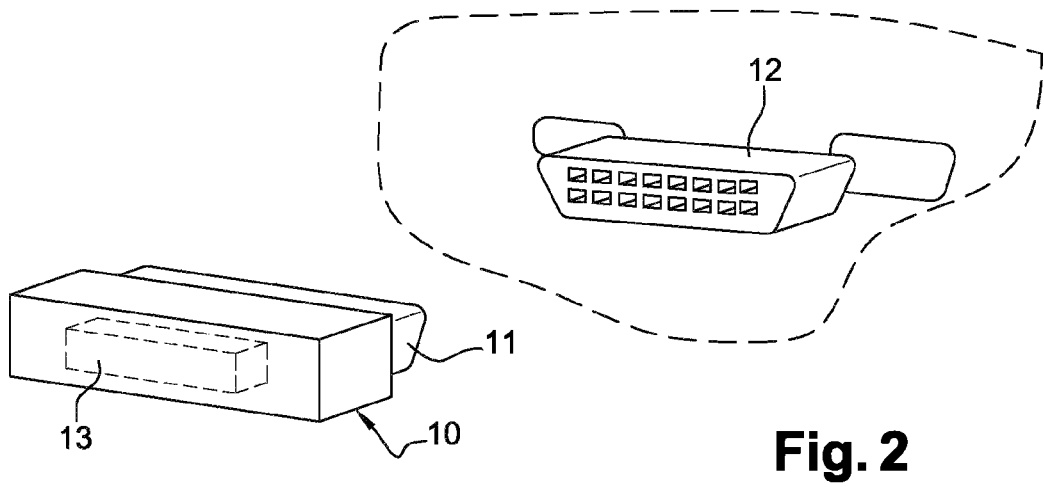
FIG. 2 is a schematic representation in perspective of the unit of the device for remotely giving warning as to the state of wear of at least one blade of a windshield-wiper system according to the invention able to be connected to the OBD of the vehicle.
Figure 3:
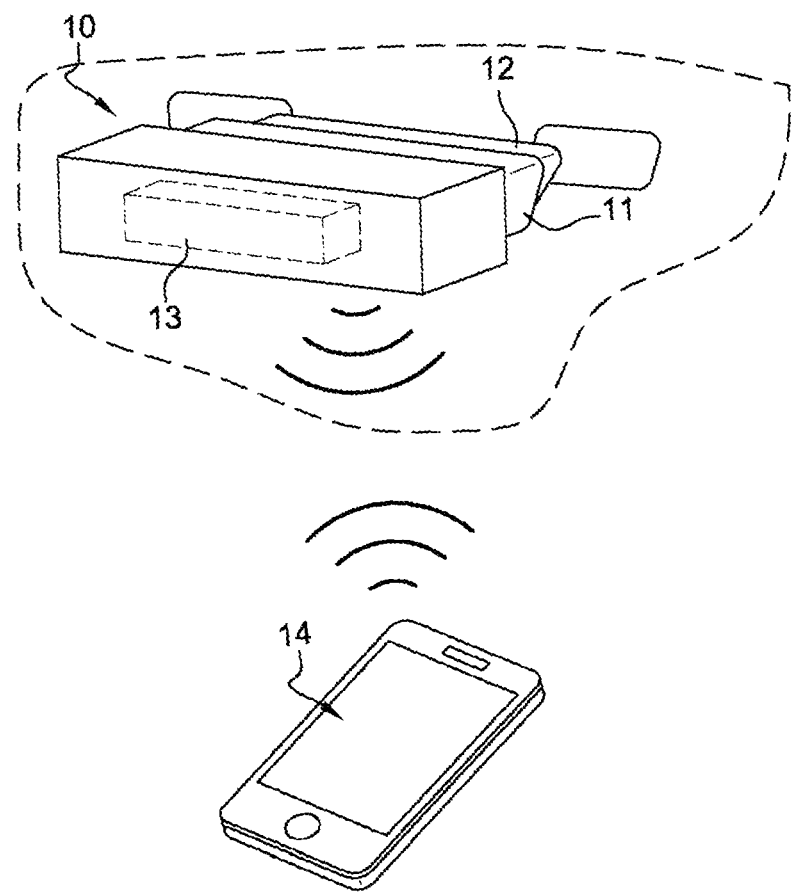
FIG. 3 is a schematic representation in perspective of the unit of the device for remotely giving warning as to the state of wear of at least one blade of a windshield-wiper system according to the invention connected to the OBD of the vehicle.

With reference to FIGS. 1 to 3, the device for detecting the wear of windshield-wiper blades according to the invention comprises, on the one hand, means 9 for determining the wear of said one or more blades 7 and, on the other hand, a unit 10 comprising a module called the removable diagnostic connector 11 able to interact with a diagnostic service connector 12 forming an on-board diagnostic input of the vehicle in order to establish a link with said diagnostic connector 11 via the OBD protocol and means 13 for communicating electronically that are coupled to the diagnostic connector 11 and that are able to transmit, to a portable electronic apparatus 14, via a wireless link, a message indicating the wear of said blades 7 when the means 9 for determining the wear of the blades 7 generate a signal referred to as a wear signal, said message being able to be displayed on said electronic apparatus 14.

The device according to the invention has the advantage of being stand-alone and of being connected to the OBD (in particular OBD II or EOBD) system that is present in all vehicles, and hence it may be employed as an "aftermarket" device in all vehicles. By OBD (in particular OBD II or EOBD) system, what is being referred to is the OBD (OBD standing for On-Board Diagnostic) standard initially set up by the CARB (Californian Air Resources Board), which standard has been employed as standard since EURO3 and European Directive 98/69/EC, as at the month of April 2018. This standard stipulates that the OBD system comprise a diagnostic service connector that must necessarily be located in the passenger compartment. Generally, said connector is located under the steering wheel in the fuse compartment or under the ashtray near the handbrake.

Alternatively, said means 9 for determining the wear of said blades 7 consist in the controller 5 of the vehicle, which is connected to the input of the on-board diagnostic service connector of the vehicle. For example, the means 9 for determining the wear of the blades 7 comprise means for deducing or estimating a coefficient of friction between the one or more wiper blades and the surface of the windshield and means for generating a wear signal depending on said coefficient of friction and on the number of wiping cycles of said one or more wiper blades, such as those described in international patent application WO2012/159943 to which those skilled in the art may refer.

Moreover, the means 13 for communicating electronically consist in a Bluetooth® transmitter that generates a communication according to the Bluetooth® protocol with the electronic apparatus 14 and/or in a transmitter that generates a communication according to the IEEE 802.11p protocol with the electronic apparatus 14 and/or in a GSM and/or GPRS transmitter that generates a telephonic communication with a remote server (not shown in the figures), said server transmitting the wear message to the electronic device 14 via the telephone network or via any wireless network known to those skilled in the art.

Said portable electronic apparatus 14 for example consists in a smartphone or in a tablet computer or the like.

Thus, the unit 10 is connected to the diagnostic service connector 12 by means of its removable diagnostic connector 11 of the OBD system of the vehicle and it generates a wear message that is transmitted to the portable electronic apparatus 14 via the means 13 for communicating electronically. Incidentally, said message transmitted to said electronic apparatus 14 advantageously comprises a hyperlink to a sales website offering the types of blade 7 suitable for the vehicle so that the user is able to request new blades 7 upon receipt of the wear message.

According to one variant of execution (not shown in the figures), said means 9 for determining the wear of said blades 7 will possibly be integrated into said unit 10 and will then be connected to the means 13 for communicating electronically.

What is claimed is:

1. A device for remotely giving warning as to the state of wear of at least one blade of a windshield-wiper system of a vehicle comprising means for determining the wear of said blade and means for flagging said wear, characterized in that it comprises at least one unit comprising a module called the removable diagnostic connector able to interact with a diagnostic service connector forming an on-board diagnostic input of the vehicle in order to establish a link with said diagnostic connector via the OBD protocol and means for communicating electronically that are coupled to the diagnostic connector and that are able to transmit, to a portable electronic apparatus, via a wireless link, a message indicating the wear of said blade when the means for determining the wear of the blade generate a signal referred to as a wear signal.

2. The device as claimed in claim 1, characterized in that the means for determining the wear of said blade consist in a controller of the vehicle connected to the on-board diagnostic input of the vehicle.

3. The device as claimed in claim 1, characterized in that the means for determining the wear of said blade are integrated into said unit and are connected to the means for communicating electronically.

4. The device as claimed in claim 1, characterized in that the means for determining the wear of the blade comprise means for generating the wear signal depending on the number of wiping cycles of the windshield-wiper blade.

5. The device as claimed in claim 1, characterized in that the means for determining the wear of the blade comprise means for deducing or estimating a coefficient of friction between the one or more windshield-wiper blades and the surface of the windshield and means for generating a wear signal depending on said coefficient of friction and on the number of wiping cycles of the one or more windshield-wiper blades.

6. The device as claimed in claim 1, characterized in that the means for communicating electronically consist in a Bluetooth transmitter that generates a communication according to the Bluetooth protocol with the electronic apparatus.

7. The device as claimed in claim 1, characterized in that the means for communicating electronically consist in a transmitter that generates a communication according to the IEEE 802.11p protocol with the electronic apparatus.

8. The device as claimed in claim 1, characterized in that the means for communicating electronically consist in a GSM and/or GPRS transmitter that generates a telephonic communication with a remote server.

9. The device as claimed in claim 1, characterized in that the portable electronic apparatus consists in a smartphone or in a tablet computer or the like.

10. The device as claimed in claim 1, characterized in that the message transmitted to said electronic apparatus contains a hyperlink.

* * * * *